US010315732B2

(12) United States Patent
Wallin (10) Patent No.: US 10,315,732 B2
(45) Date of Patent: Jun. 11, 2019

(54) VESSEL COMPRISING CARGO TRANSLOADING SYSTEM

(71) Applicant: MACGREGOR SWEDEN AB, Enköping (SE)

(72) Inventor: Tomas Wallin, Enköping (SE)

(73) Assignee: MACGREGOR SWEDEN AB, Enköping (SE)

( * ) Notice: Subject to any disclaimer, the term of this patent is extended or adjusted under 35 U.S.C. 154(b) by 474 days.

(21) Appl. No.: 15/300,484

(22) PCT Filed: Jan. 26, 2015

(86) PCT No.: PCT/EP2015/051499
§ 371 (c)(1),
(2) Date: Sep. 29, 2016

(87) PCT Pub. No.: WO2015/149961
PCT Pub. Date: Oct. 8, 2015

(65) Prior Publication Data
US 2017/0120991 A1    May 4, 2017

(30) Foreign Application Priority Data
Apr. 2, 2014    (EP) .................................. 14163229

(51) Int. Cl.
*B63B 27/30*     (2006.01)
*B63B 27/10*     (2006.01)
(Continued)

(52) U.S. Cl.
CPC .............. *B63B 27/30* (2013.01); *B63B 27/10* (2013.01); *B63B 39/02* (2013.01); *B65G 67/60* (2013.01);
(Continued)

(58) Field of Classification Search
CPC ......... B63B 27/10; B63B 27/30; B63B 39/02; B63B 2734/00; B65G 67/60; B65G 2814/0397
See application file for complete search history.

(56) References Cited

U.S. PATENT DOCUMENTS 3,207,329 A * 9/1965 Bevard .................... B63B 27/10
                                                       212/322
3,426,719 A * 2/1969 Mizell ................... B63B 27/143
                                                        14/71.1
(Continued)

FOREIGN PATENT DOCUMENTS

DE           4214486 A1    11/1993
DE     102011050857 A1    12/2012
(Continued)

OTHER PUBLICATIONS

Lloyd Damen Shipyard: "Damen CBA 6324 Bulk Cargo or Container Crane Barge", Transshipment of Bulk Cargoes and Containers Class Notation Remote Controlled Grab Container Equipment, Jan. 16, 2013.
(Continued)

*Primary Examiner* — Michael E Gallion
(74) *Attorney, Agent, or Firm* — Moser Taboada (57) ABSTRACT

The present invention relates to a vessel (200, 300, 400, 600) comprising: a cargo transloading system, comprising: a crane (210, 310, 410, 610) supporting a cargo handling device (318, 418), and a counterweight arrangement (450, 550). The cargo handling device (318, 418) being rotatable about a vertical axis of rotation arranged with a first fixed offset in a first side direction with regard to a first vertical plane coinciding with a longitudinal center axis (CA) of the vessel (200, 300, 400, 600). The counterweight arrangement (450, 550) comprising a weight (452, 552, 652) which is movable such that the mass center (554) of the weight (452,
(Continued)

552, 652) is laterally displaceable between a first end position (556, 656) in which the mass center (554) is arranged in the vicinity of the first vertical plane and a second end position (558, 658) in which the mass center (554) is arranged with a second offset in a second side direction opposite to the first side direction with regard to the first vertical plane. The counterweight arrangement (450, 550) being arranged to move the weight (452, 552, 652) while the cargo handling device (318, 418) is rotated about the axis of rotation as a function of the rotation angle (a). The present invention also relates to a corresponding method and a use of the vessel (200, 300, 400, 600).

12 Claims, 5 Drawing Sheets (51) Int. Cl.
*B63B 39/02* (2006.01)
*B65G 67/60* (2006.01)

(52) U.S. Cl.
CPC .. *B63B 2734/00* (2013.01); *B65G 2814/0397* (2013.01)

(56) References Cited

U.S. PATENT DOCUMENTS

| | | | |
|---|---|---|---|
| 4,103,783 A * | 8/1978 | Beduhn | B66C 23/74 212/195 |
| 4,220,246 A * | 9/1980 | Ray | B66C 5/08 212/198 |
| 2006/0042534 A1 * | 3/2006 | Pollack | B63B 27/10 114/258 |

FOREIGN PATENT DOCUMENTS

| | | |
|---|---|---|
| JP | S53108075 U | 8/1978 |
| KR | 20110139870 A | 12/2011 |
| WO | WO-2009048322 A1 | 4/2009 |

OTHER PUBLICATIONS

International Search Report dated May 7, 2015 for PCT Application No. PCT/EP2015/051499.

\* cited by examiner

Graph 1.

VESSEL COMPRISING CARGO TRANSLOADING SYSTEM

TECHNICAL FIELD

The present invention relates to a vessel comprising a cargo transloading system comprising a crane supporting a cargo handling device, and a counterweight arrangement. The invention also relates to a method for controlling a cargo transloading system for a vessel and a use of a vessel for transloading of cargo.

BACKGROUND ART

Today a substantial amount of cargo is shipped around the globe using large naval vessels or ships capable of traveling long distances over open sea.

When shipping bulk cargo or load, such as coal or ore, large bulk naval vessels or ships dedicated for loading bulk cargo are commonly used due to their capability of loading bulk cargo. Bulk vessels are commonly equipped with large cargo holds which are covered by some form of hatch or cover which is opened during loading and unloading of the cargo concerned. When handling bulk cargo, cranes equipped with buckets or similar are commonly used to handle the cargo.

Due to the substantial size of the bulk vessels used for long distance shipments, large harbor constructions or long piers are needed to ensure a sufficient depth enabling the vessels to moor during loading and unloading of cargo.

Infrastructures, such as harbors or piers are very costly to build and to maintain. Given this, it is today common to transload cargo from less sophisticated harbors, having a limited depth, to large naval vessels or ships used for long distance shipping.

The harbors used in case of transloading may even be temporary harbors or piers offering only a few meters of depth. Such temporary harbors or piers are commonly constructed in proximity to ore or coal deposits from which bulk cargo in form of ore or coal is to be shipped over long distances.

During the transloading of the bulk cargo, e.g. ore or coal, to the large naval vessel or ship it is common to use a number of barges, so called feeder barges, for carrying the cargo from the harbor to the large naval vessel. The barges are commonly simple open, often un-motorized, boats typically carrying 6000-10000 tons of cargo. The barges are commonly loaded with the bulk cargo using land based equipment such as cranes or dump trucks. After having been loaded, the barges are pulled or propelled to the large naval vessel or ship onto which the bulk cargo is going to be loaded. The loading of the large naval vessel or ship often takes place 5-8 nautical miles ashore, where the large naval vessel or ship is anchored during the loading.

In order to unload the cargo from a barge and load it onto the large naval vessel so called transloaders are commonly used. The transloaders used are motorized barges equipped with a crane used to transfer the cargo from the feeder barge or cargo carrying barge to the large naval vessel. The crane of the transloader is commonly rotatable and has a crane arm whose luffing angle is adjustable so as to be able to handle cargo at different distances from the crane itself.

The transloader may also be referred to as a barge, a crane barge, a floating crane, a floating cargo crane etc. Transloaders used today are typically about 70 m long and 25 m wide and is equipped with a crane capable of hoisting 30-50 tons.

Figure 1:
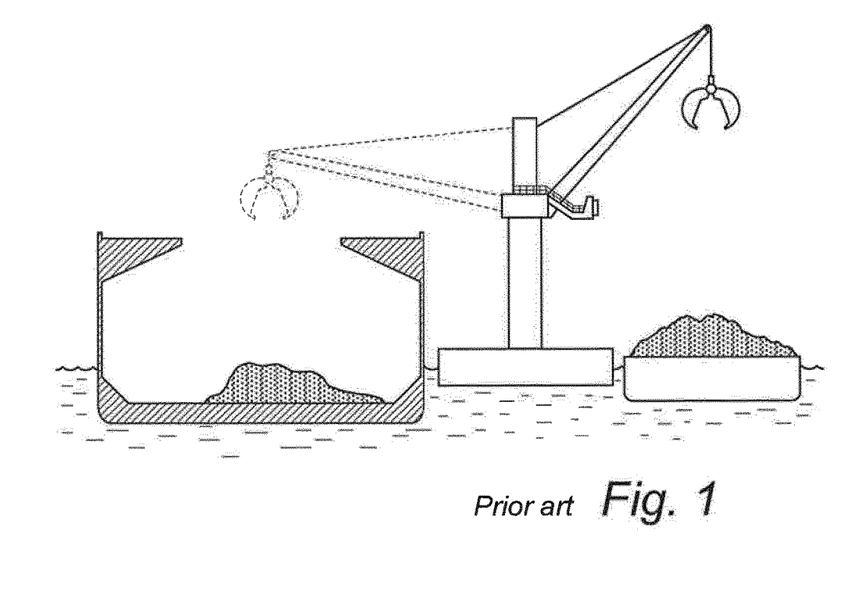
FIG. 1 conceptually illustrates a cross sectional view of a prior art transloader during transloading of cargo.

FIG. 1 schematically illustrates a cross sectional view of a transloader according to prior art during transloading of cargo. The transloader is equipped with a centrally located crane. The transloader is illustrated during transfer of cargo where the transloader is positioned between the large naval vessel, shown to the left in the figure, and the barge carrying the cargo, shown to the right in the figure. Hence, the crane of the transloader can hoist cargo from the cargo carrying barge onto the large naval vessel or vice versa. The crane is shown in two working positions (one of which is shown with dotted lines), where the bucket of the crane is located at a centre of the cargo carrying barge and at a centre of the large naval vessel, respectively.

The hoisting of cargo brings about that the transloader is subjected to a large tilting momentum which will result in that the transloader is rolled, i.e. tilted sideways. A too large roll angle will bring about difficulties in operating the crane and will also render the security questionable. Too large rolling angles will consequently render the transloader unusable.

To address the problem of rolling caused by the tilting momentum of the crane, it is common practice to arrange a counterweight on the crane itself. The counterweight is commonly placed in an elevated position on a tower or pedestal on which the crane itself is positioned and is arranged to co-rotate with the crane such that the counterweight is always located on a side of the crane being opposite to the hoisting side. A counterweight in an elevated position does however bring about stability issues due to the increased height of the mass center of the transloader.

JPS-53108075-U suggests using a movable counterweight located below deck on a floating crane in order to counteract rolling of the floating crane. The counterweight may be moved to a starboard side and a port side so as to compensate for tilting momentums related to the operation of the crane.

As discussed above, the cargo which is being transloaded is retrieved from the cargo carrying barge by means of e.g. a bucket and dropped into a cargo load compartment on the large naval vessel. During the transloading procedure the luffing angle of the crane of FIG. 1 has to be adjusted as is shown in FIG. 1. The crane arm will have to be raised when retrieving cargo from the cargo carrying barge, mainly due to the fact that the cargo carrying barge is narrower than the large naval vessel. In other words, the crane arm of FIG. 1 will have to be raised to retrieve cargo from a central position of the narrow cargo carrying barge and subsequently be lowered to reach a central position of the large naval vessel in order to drop of cargo here.

Hence, the luffing angle of the care arm will have to be adjusted such that the cargo in average is retrieved closer to the crane than it is being dropped off onto the large naval vessel. Crane operation including adjustment of the luffing angle is time consuming bringing about a reduced overall capacity of the transloader.

Lloyd Damen Shipyard: "Damen CBA 6324 bulk cargo or container crane barge", Transshipment of bulk cargoes and containers CLASS NOTATION Remote controlled Grab CONTAINER EQUIPMENT, 16 Jan. 2013, XP055144599, discloses a bulk cargo or container crane barge employed with a crane being located off centre with regard to a longitudinal centre axis of the crane barge. The crane barge is employed with a counterweight arrangement having a counterweight being positioned in an elevated position on a crane pedestal. The counter weight co-rotates with the crane, when the carne is rotated.

Hence, there is a need for an improved transloader having an increased capacity.

SUMMARY OF THE INVENTION

With the above in mind, it is an object of the present invention to provide an improved vessel comprising a cargo transloading system and use thereof for transloading cargo.

A further object of the invention is to provide an improved method for controlling a cargo transloading system for a vessel.

In order to achieve at least one of the above objects, and also other objects which will be evident from the following description, according to an aspect of the invention a vessel is provided comprising: a cargo transloading system, said cargo transloading system comprising: a crane supporting a cargo handling device, and a counterweight arrangement, said cargo handling device being rotatable about a vertical axis of rotation arranged with a first fixed offset in a first side direction with regard to a first vertical plane coinciding with a longitudinal centre axis of said vessel, said counterweight arrangement comprising a weight which is movable such that the mass centre of said weight is laterally displaceable between a first end position in which said mass centre is arranged in the vicinity of said first vertical plane and a second end position in which said mass centre is arranged with a second offset in a second side direction opposite to said first side direction with regard to said first vertical plane, said counterweight arrangement being arranged to move said weight while said cargo handling device is rotated about said axis of rotation as a function of the rotation angle.

The inventive vessel is advantageous in that the capacity of the vessel may be enhanced without introducing additional roll to the vessel during transloading of cargo.

Consequently, the present invention is based on the realization that it is possible to increase the capacity of the transloader by positioning the crane such that the cargo handling device is being rotatable about a vertical axis of rotation arranged with a first fixed offset in a first side direction with regard to a first vertical plane coinciding with a longitudinal centre axis of the vessel. In other words, the crane is positioned on a starboard side or a port side of the vessel and not in a central location, i.e. the crane is located off centre with respect to the longitudinal centre axis of the vessel. The off-center location of the crane brings about that the crane may be operated in a more efficient way bringing about a higher transloading capacity of the vessel.

The off centre located crane is according to the invention used in combination with a counterweight arrangement. The counterweight arrangement is consequently used to counteract roll of the vessel resulting from a tilting momentum exerted by the crane.

It should be noted that within the context of this application the term "vessel" may be any type of floating vessel, including a transloader, a crane barge or similar.

It should be noted that within the context of this application the term "cargo transloading system" may be any type of system comprising a crane and a counterweight arrangement which is capable of transloading any type of cargo between a first type of transportation and a second type of transportation.

The wording "cargo handling device" may be any type of device capable of handling and holding cargo during hoisting of the cargo. The cargo handling device may for instance be a bucket, a receptacle, a pallet handling device, a net, a sack, a box or similar.

The cargo handling device is rotatable about a vertical axis of rotation by a rotation angle. This may be achieved by the crane supporting the cargo handling device being rotatable about a rotation centre. It should be noted that within the context of this application the term "rotation angle" may be any angle through which the cargo handling device may be rotated. This means that also the crane is rotatable through a rotation angle, as the cargo handling device is supported by the crane. For instance, the crane may be provided with a rotation stop or rotation stops binging about that the crane and the cargo handling device supported thereon may be rotatable through specific angles, i.e. the crane may be operable in a specific angle interval. The angle interval may advantageously be selected such that the crane may reach out in any angle but is not allowed to rotate an indefinite number of turns. By such an arrangement, the crane may thus rotate back and forth as the crane is operated during e.g. transloading of cargo. Similarly, the crane may be rotatable any number of turns about a rotation angle, bringing about that also the cargo handling device is rotatable by any number of turns about the rotation angle.

By "counterweight arrangement" is meant any arrangement including a counterweight which may be used to counteract a tilting momentum, wherein the weight is movable such that the mass centre of the weight is laterally displaceable as a function of the rotation angle of the cargo handling device.

By "end position" is meant any position in which the mass centre of the counterweight and consequently the counterweight itself cannot be moved any further in the direction used to reach the end position. Hence, when the mass centre of the counter weight reaches an end position the counter weight cannot be moved any further in that direction. To put it differently, the counter weight cannot be moved any further away from another end position when reaching an end position, as any further movement is limited. Further movement may be mechanically limited. This may be for instance be achieved by some kind of mechanical stopping means such as a buffer, or may be achieved by having a rail on which the counter weight travels which does not continue any further.

It should be noted that within the context of this application the term "function" may refer to any relation between the rotation angle and the movement of the counterweight. The relation may be based on feedback, such as a signal from a sensor or sensors detecting the rotation angle and the position of the weight. Similarly, the relation may not be based on any feedback. For instance, the relation between the rotation angle and the mass center of the counterweight may be based solely on operation times of the crane and the counterweight arrangement respectively. I.e. the relation may determined by the respective operation times without any feedback.

According to preferred embodiments, said function may be configured such that said weight is movable from said first end position only while said cargo handling device occupies a rotation angle representing a location situated on a side pointed out by said first side direction of a second vertical plane extending in parallel with said first vertical plane and coinciding with said axis of rotation. The possibility to move the counterweight from the first end position only while the cargo handling device occupies a rotation angle representing a location situated on a side pointed out by the first side direction of a second vertical plane extending in parallel with the first vertical plane and coinciding with the axis of rotation brings about the advantage that the counterweight may be moved in a manner so as to at least partly compensate for a tilting momentum exerted by the crane due to the fact that the cargo handling device being rotatable about the vertical axis of rotation arranged with a fixed offset with regard to a longitudinal centre axis of the vessel. In other words, tilting momentums exerted by the crane due to an off-centre positioning of the crane on the vessel may be at least partly compensated for.

According to preferred embodiments, said function may be configured such that said weight is movable from said first end position with regard to a lever arm component of said cargo handling device in said first side direction with regard to said vertical axis of rotation, such that at least a portion of a tilting momentum exerted by said cargo handling device on said crane is compensated for. By moving the mass center of the counterweight as a function of a lever arm component, the compensation of the tilting momentum may be further improved.

According to embodiments of the invention, said weight may be arranged to be moved along a direction being normal to said first vertical plane.

According to preferred embodiments, said weight may be movably arranged on a rail by means of wheels, which is advantageous in that the weight may be movably arranged in a simple but yet effective manner.

Preferably, said weight may movable by means of an electric motor, which is advantageous in that the weight may be moved in a reliable and energy efficient manner.

Preferably, said electric motor may be arranged to act directly or indirectly on a gear rack such that said weight is moved. By arranging the electric motor to act on a gear rack, the weight may be moved in a secure manner with little risk of skidding.

Preferably, said electric motor may be arranged to increase and to reduce a moving speed of said weight, which is advantageously in that no separate systems are required for increasing and reducing the moving speed respectively.

According to preferred embodiments, said electric motor may be arranged to recover kinetic energy from said weight when reducing said moving speed of said weight. By recovering energy when reducing the moving speed of the weight the amount of energy used by the counterweight arrangement may be reduced.

According to another aspect of the invention, there is provided a method for controlling a cargo transloading system for a vessel, said cargo transloading system comprising a crane supporting a cargo handling device, and a counterweight arrangement, said cargo handling device being rotatable about a vertical axis of rotation arranged with a first fixed offset in a first side direction with regard to a first vertical plane coinciding with a longitudinal centre axis of said vessel, said counterweight arrangement comprising a weight which is movable such that the mass centre of said weight is laterally displaceable between a first end position in which said mass centre is arranged in the vicinity of said first vertical plane and a second end position in which said mass centre is arranged with a second offset in a second side direction opposite to said first side direction with regard to said first vertical plane, said method comprising: moving said weight while said cargo handling device is rotated about said axis of rotation as a function of the rotation angle, by moving said weight from said first end position only while said cargo handling device occupies a rotation angle representing a location situated on a side pointed out by said first side direction of a second vertical plane extending in parallel with said first vertical plane and coinciding with said axis of rotation. In general, features of this aspect of the invention provide similar advantages as discussed above in relation to the previous aspect of the invention. Further, it should be noted that the inventive method may incorporate any of the features described above in association with the inventive vessel, and has the same corresponding advantages.

According to one embodiment of the invention, said method may further comprise moving said weight from said first end position with regard to a lever arm component of said cargo handling device in said first side direction with regard to said vertical axis of rotation, such that at least a portion of a tilting momentum exerted by said cargo handling device on said crane is compensated for.

According to another aspect of the invention, there is provided a use of a vessel according to the invention for transloading cargo between a first type of transportation and second type of transportation by positioning said vessel between said first type of transportation and said second type of transportation and transloading cargo between said first type of transportation and said second type of transportation by means of said transloading system of said vessel. By using a vessel according to the invention for transloading cargo between a first type of transportation and second type of transportation the capacity of the transloading may be enhanced bringing about that a larger amount of cargo may be transloaded per unit time compared to prior art solutions.

Said first type of transportation may be an ocean going ship and said second type of transportation may be a feeder barge.

Said vessel may be positioned between said ocean going ship and said feeder barge such that said axis of rotation is located closer to said ocean going ship than to said feeder barge, which is advantageous in that the crane of the vessel may be operated in a more efficient manner since a luffing angle of the crane will have to be adjusted less.

Further features of, and advantages with, the present invention will become apparent when studying the appended claims and the following description. The skilled person will realize that different features of the present invention may be combined to create embodiments other than those described in the following, without departing from the scope of the present invention.

BRIEF DESCRIPTION OF THE DRAWINGS

The aspects of the invention, including its particular features and advantages, will be readily understood from the following detailed description and the accompanying drawings, in which.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 2:
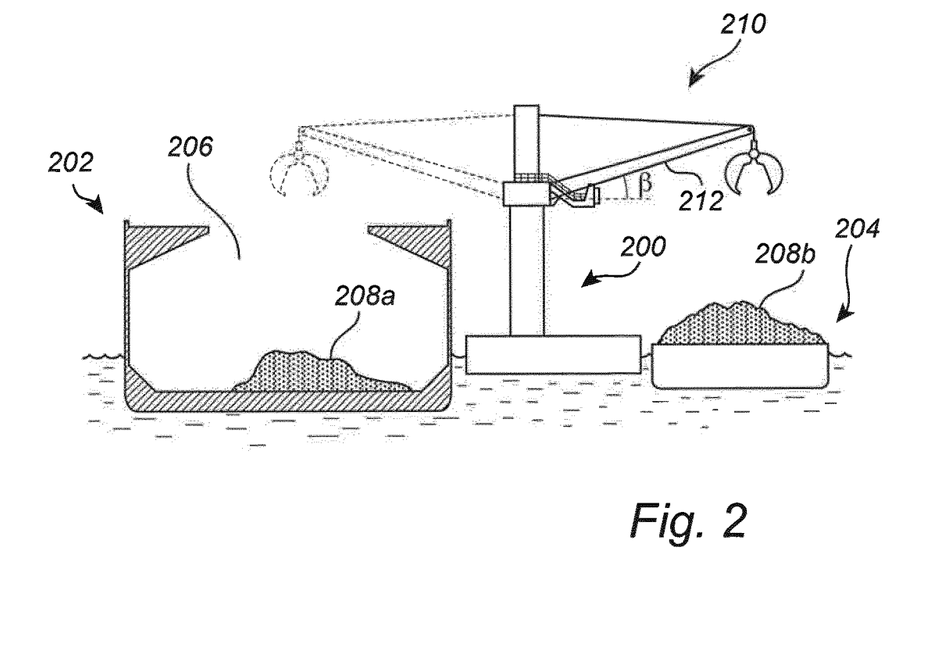
FIG. 2 conceptually illustrates a cross sectional view of a transloader according to the present invention during transloading of cargo.

FIG. 2 illustrates a cross sectional view during transloading of cargo. Cargo is transloaded by means of a vessel 200 in accordance with the present invention in form of a transloader 200 which is positioned between an ocean going ship 202 and a barge 204 used for transferring cargo from a harbor. In the following detailed description, the inventive vessel 200 will be referred to as a transloader 200 for reasons of simplicity. In the illustrated cross sectional view, the cargo hold 206 of the ship 202 is partly filled with bulk cargo 208a which has been transferred from the barge 204 to the ship 202 by means of the transloader 200. The barge 202 is partly loaded with bulk cargo 208b.

The transloader 200 is equipped with a crane 210. The crane 210 is provided on the transloader 200 in a position closer to the ship 202 than to the barge 204. The non central or off-centre positioning of the crane 210 brings about that the crane 210 is capable of reaching further out over the cargo hold of the ship 202 as compared to the prior art transloader of FIG. 1 where the crane is centrally located. On the other hand, the crane 210 is still capable of reaching over a majority of the width of the barge 204. The crane 210 is shown in two different working positions, one where the crane 210 is reaching out over a central position of the ship 202 (indicated by dotted lines) and one where the crane 210 is reaching out over a central position of the barge 202.

As can be seen in FIG. 2, the luffing angle $\beta$, i.e. the raise angle, of the crane arm or jib 212 has to be adjusted less in order to reach a central position of the ship 202 and a central position of the barge 204 as compared to the prior art transloader of FIG. 1. In other words, the crane 210 is positioned on the transloader 200 such that the crane 210 is more or less located centrally with respect to the center point of the ship 202 and the barge 204. This means that the luffing angle $\beta$ on an average need to be adjusted significantly less during transloading of cargo between the barge 204 and the ship 202. As the adjustment of the luffing angle $\beta$ of the crane arm 212 commonly is the most time consuming movement of the crane 210, the adjustment of the luffing angle $\beta$ commonly determines the actual time of a working cycle of the crane 210, where cargo is retrieved from the barge 204 and subsequently dropped off on the ship 202. Hence, by positioning the crane 210 off-centre as illustrated in FIG. 2 a mean working cycle time of the crane may be significantly reduced bringing about an increased transloading capacity of the transloader 200.

Figure 3:
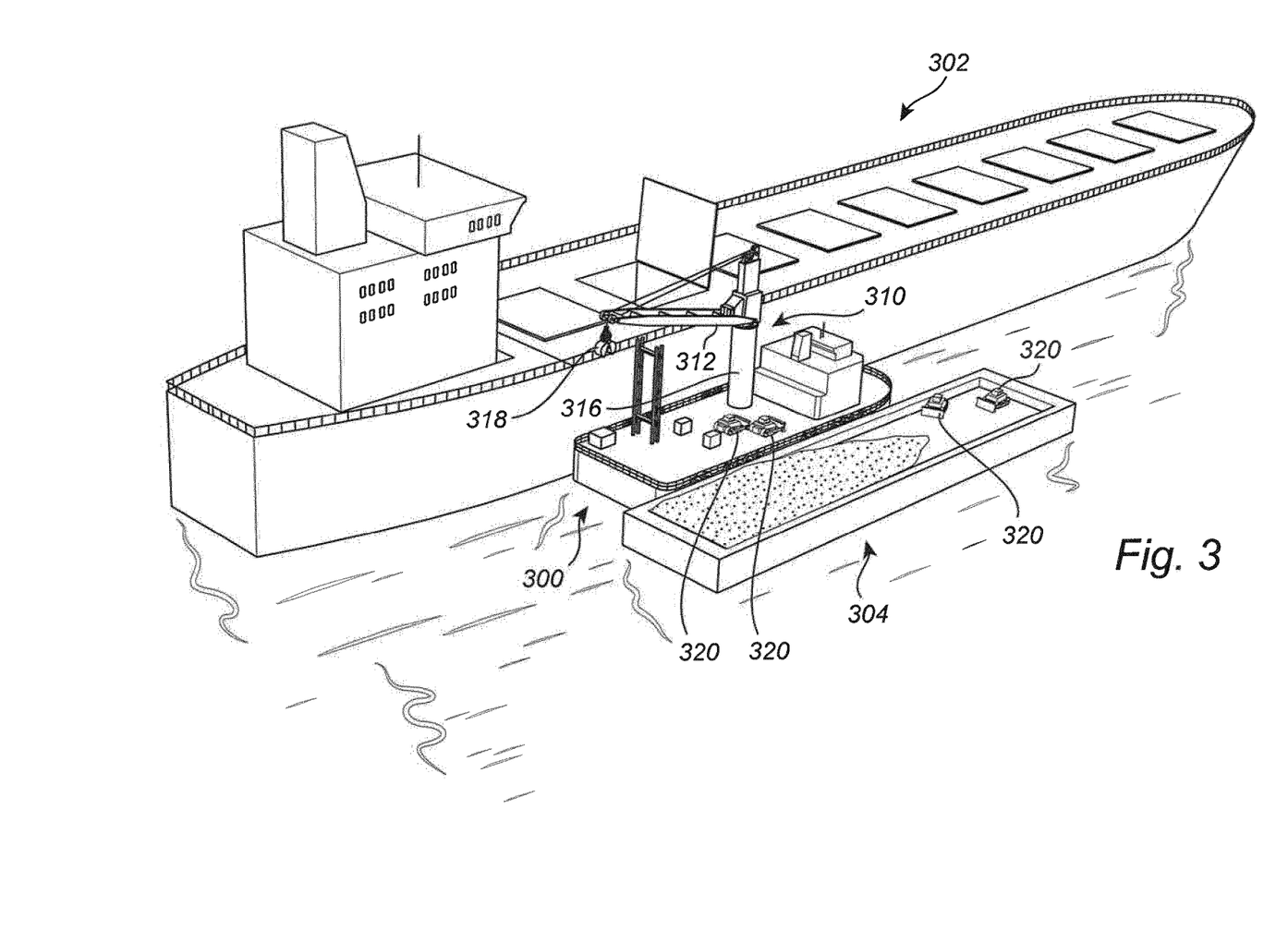
FIG. 3 is a perspective view of a transloader during transloading of cargo.

Now referring to FIG. 3, here is conceptually depicted an inventive transloader 300 during transloading of cargo from a barge 304 to a ship 302. In the following the transloader as such will be described with reference to FIGS. 3 and 4.

Figure 4:
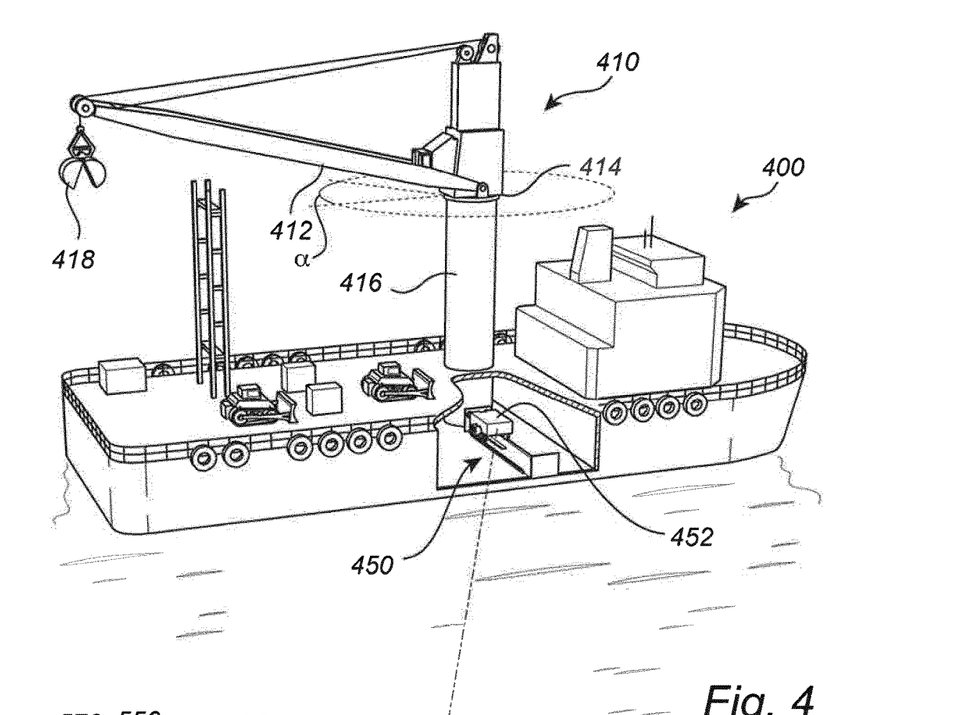
FIG. 4 schematically illustrates a how counterweight arrangement is arranged below deck on a transloader having an off-centre crane.

The transloader 300, 400 depicted in the shown embodiment has an overall length of 68.40 m and a width of 24.00 m.

The transloader 300, 400 is provided with a rotatable crane 310, 410, i.e. the cargo handling device 318, 418 supported by the crane 310, 410 is rotatable about a vertical axis of rotation by a rotation angle $\alpha$. A crane pedestal or tower 316, 416 is erected on the deck of the transloader and reaches 16.00 m above the deck level. The crane 310, 410 is in turn mounted on top of the crane pedestal 316, 416. This means that a rotation point 414 of the crane 310, 410 is provided on top of the crane pedestal 316, 416, bringing about that a vertical rotation axis of the cargo handling device 318, 418 is coinciding with the rotation point 414 of the crane 310, 410.

In the depicted transloader 300, 400 the rotation angle $\alpha$ is sensed or determined using two different sensors, not shown. The first sensor is an inclinometer from which a direct value of the rotation angle $\alpha$ may be read out. The second sensor is of the encoder type and gives a specific number of pulses for a specific rotation, i.e. a turn corresponds to a specific number of pulses. By counting the pulses and the time elapsed between the pulses, the rotation angle $\alpha$ and the angular velocity of the crane 310, 410 may be determined.

The crane pedestal 316, 416 is provided essentially amidships with respect to a longitudinal direction of the transloader 300, 400. On the other hand, the crane pedestal 316, 416 is positioned 6.00 m to the port side of the depicted transloader 300, 400 with respect to a longitudinal centre line or axis of the transloader 300, 400. This means that the rotation point 414 of the crane 310, 410 and the cargo handling device 318, 418 is likewise provided 6.00 m to the port side of the transloader 300, 400. This means that a vertical axis of rotation of the crane 310, 410 and the thereon supported cargo handling device 318, 418 is offset with a fixed offset of 6.00 m with regard to a first vertical plane coinciding with a longitudinal centre axis of the depicted transloader 300, 400. The vertical axis of rotation is offset in a first side direction, coinciding with a port side direction of the depicted transloader 300, 400.

The crane 310, 410 is equipped with a 36.00 m long jib or arm 312, 412. The luffing angle $\beta$ of the arm 312, 412 may be adjusted by means of wires, i.e. the carne arm 312, 412 may be raised by tightening the wires used for controlling the luffing angle $\beta$. Similarly, the crane arm 312, 412 may be lowered by loosening the wires controlling the luffing angle $\beta$.

The crane 310, 410 is designed to handle loads of 50 tons. This means that the crane 310, 410 is capable of hoisting loads of at least 50 tones including the weight of the cargo handling device 318, 418 used. A cargo handling device 318, 418 in form of a bucket 318, 418 is suspended by wires from an outer position of the crane arm 312, 412. The bucket 318, 418 may be lowered and raised by losing and tightening the wires suspending the bucket 318, 418. Further, the bucket 318, 418 may be controlled so as to grab and release bulk cargo e.g. in form of coal or ore. Depending on the density of the bulk cargo, different sizes of buckets 318, 418 are commonly used. This is done in order to optimize the loading in a manner where a full bucket 318, 418 more or less corresponds to a load of 50 tons. Hence, a smaller bucket 318, 418 is commonly used in case of a more dense material as compared to a less dense material.

The non central positioning or off-centre positioning of the rotation point 414 of the crane 310, 410 brings about that the luffing angle $\beta$ of the crane 310 needs to be adjusted less as compared to prior art solutions as discussed above. On the other hand, the non central positioning of the crane 310, 410 brings about that the crane 310, 410 will exert a larger tilting momentum to the transloader 300, 400 when the crane 310 is operating on the port side of the transloader 300, 400 due to a longer lever arm with respect to the longitudinal centre line of the transloader 300, 400. Conversely, when the crane 310 is operating on a starboard side of the transloader 300, 400, the non central position of the crane 310, 410 will result in lower tilting momentum exerted by the crane 310, 410 on the transloader 300, 400, due to a shorter lever arm with respect to the longitudinal centre line or axis of the transloader 300, 400. This means that the larger tilting momentum exerted on the transloader 300, 400 due to the longer lever arm will result in that the transloader 300, 400 will be subjected to a larger roll angle if not compensated for.

As discussed above, too large roll angles of the transloader 300, 400 will result in that the transloader 300, 400 becomes unusable due to difficulties in handling the crane 310, 410 and safety issues. A roll angle of 5 degrees is often considered as a maximum allowed roll angle. When the transloader 300 is rolling more than 5 degrees the crane 312, 412 becomes too difficult to handle in principle rendering the transloader 300, 400 unusable.

In order to still be capable of handling cargo without rolling too much, i.e. more than 5 degrees, the transloader 300, 400 is equipped with a counterweight arrangement 450 having a movable counterweight 452. The counterweight 452 is designed to compensate for the longer lever arm when the crane 310, 410 is operating on a port side of the transloader 300, 400. The construction of the counterweight arrangement 450 and its function will be discussed in more detail hereinafter with reference to FIGS. 4 and 5.

It is to be noted that the roll angle of the transloader 300, 400 is not only dependent on the loads handled by the transloader but also on the weather conditions the transloader 300, 400 is subjected to. Harsh weather which results in large waves will for natural reasons influence the roll angle of the transloader 300, 400. If the waves become too large, the roll angle of the transloader may very well exceed 5 degrees even when the transloader 300, 400 is not handling any cargo at all, i.e. when the crane is in its rest position.

By studying significant wave heights in various seas the availability, i.e. use time, of the transloader 300, 400 may be estimated. This means that it is possible to design the transloader 300, 400 such that a mean availability in certain seas may be estimated with a reasonably high accuracy.

During the transloading process the ship 302 will anchor typically 5-8 nm ashore. Following this, the transloader 300, 400 will moor alongside the ship 302, i.e. the transloader 300, 400 will run up alongside the ship 302 in a loading position and will subsequently be made fast to the ship 302 by means of hawsers or ropes. It is to be noted that the transloader 300, 400 is positioned with its port side along the ship 302, such that the crane 310, 410 is located closer to the ship 302 than to the opposite side, i.e. the starboard side, of the transloader 300, 400.

Following this a barge 304 is pushed or propelled up alongside the starboard side of the transloader 300. The barge 304 is made fast to the transloader 300, 400 by means of hawsers or ropes. Once the respective vessels are in position the transloading process may start.

During the transloading process, the crane 312, 412 of the transloader 300, 400 is used to retrieve cargo from the barge 304 and to drop the cargo off at the ship 302 and into its cargo hold. In order to reach various locations on the barge 304, the rotation angle α of the crane 310, 410 and the luffing angle β of the crane arm 312, 412 are adjusted. Correspondingly, the rotation angle α of the crane 310, 410 and the luffing angle β of the crane arm 312, 412 are adjusted such that the cargo may be dropped off at different locations on the ship 302.

To further improve the transloading process, bulldozers 320 are used to push the cargo on the barge 304 into positions where the cargo is easily retrievable by the bucket 318, 418 of the crane 310, 410. The bulldozers 320 used are stationed on the transloader 300, 410 and are transferred to the barge 304 by means of the crane 310, 410 when needed in order to move cargo on the barge 304.

Figure 5:
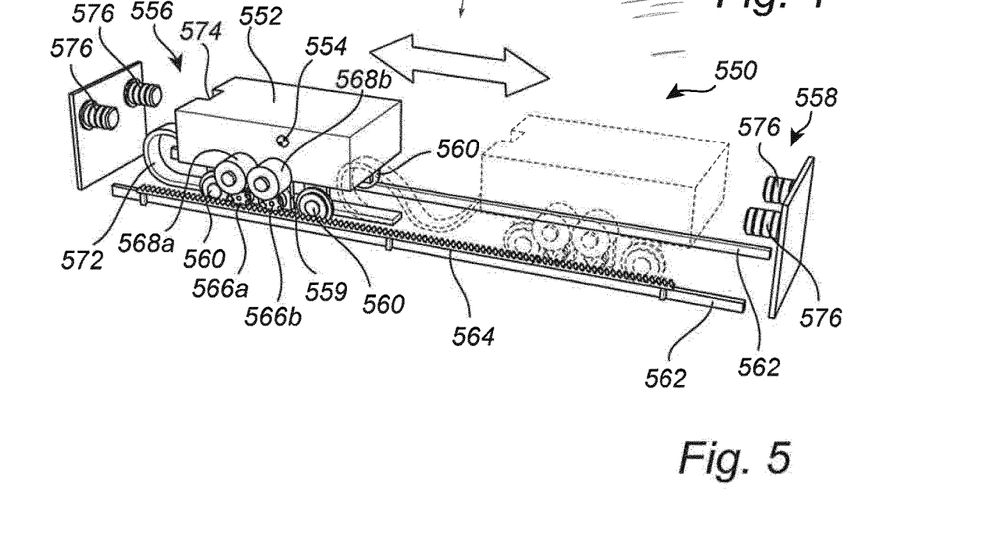
FIG. 5 is a detailed perspective view of the counterweight arrangement of FIG. 4.

Now referring to FIG. 5. FIG. 5 conceptually illustrates the counterweight arrangement 450, 550 arranged below deck on the transloader 400. The counterweight arrangement 550 includes a weight 452, 552 which is movable in a transverse direction of the transloader 400. The weight 452, 552 is arranged such that a mass centre 554 thereof may be moved between a first end position 556 located close to the longitudinal centre line of the transloader 400 and a second end position 558 located on a starboard side of the transloader 400. In other words, the mass centre 554 of the weight 452, 552 is arranged in the vicinity of the above discussed first vertical plane when in the first end position 556. On the other hand, when the mass centre 554 of the weight 452, 552 is in the second end point 558, the mass centre 554 is arranged with a second offset in a second side direction opposite to the above discussed first side direction with regard to the above discussed first vertical plane. Hence, the second side direction is coinciding with a starboard side direction of the depicted transloader 300, 400.

The weight 452, 552 may be moved to counteract a tilting momentum exerted by the crane when the crane 410 is operating on a port side thereof, i.e. when the crane arm 412 is pointing in a direction having a component in a starboard direction of the transloader 400.

In the depicted transloader 200, 300, 400 the weight 452 may be moved in a direction being normal to the longitudinal centre line of the transloader 400. Further, the direction of the movement may be horizontal meaning that the weight 452, 552 will remain on the same level given that the roll angle of the transloader 400 is zero. The travel length of the weight 452, 552 is 9.0 m, in the depicted transloader 400, implying that the mass centre 554 thereof also may be moved 9.0 m. As can be seen in FIGS. 4 and 5, the mass center 554 of the weight 452, 552 is movable on the starboard side of the transloader 400 whereas the crane 410 is located on the port side of the transloader 400 meaning that the weight may be moved so as to counteract an additional tilting momentum exerted by the crane 410 due to its off centre position on the transloader 400.

In the depicted transloader 400 the weight is made of a stack of steel plates, each having a thickness of 40 mm. The total mass of the weight is about 160 tons. Other weights may be chosen depending on the needs.

The weight of 160 tons is chosen so as to even out the tilting momentum of the crane 410 and the bucket 418 attached thereto when the crane 410 is reaching out to a maximum on the port side of the transloader 400. To put it differently, by positioning the weight 452 in the second end position 558, 9 m off centre on the starboard side, and the crane 410 with the crane arm 412 in a horizontal position pointing straight in a portside direction of the transloader 400, and having a bucket 418 attached with no cargo, the transloader 400 will be subjected to a zero degree roll angle if not subjected to any waves or other external conditions.

The counterweight arrangement 450, 550 will now be described in more detail with reference to FIG. 5. The weight 552 of the counterweight arrangement 550 is carried by a bogie 559 equipped with four steel wheels 560. The wheels 560 are arranged on a steel rail 562, implying that the weight 552 may be slid along the rail 562 as the wheels 560 are rotating. A gear rack 564 is provided parallel to the rail 562. Two gears 566a, b are provided on the bogie 559 so as to mesh with the gear rack 564.

Two electrical motors 568a, b are provided on the bogie 559. The motors 568a, b are mechanically coupled to the respective gears 566a, b by means of reduction gears, not shown. The reduction gears are used to reduce the motor rotation speed such that the gears 566a, b are rotating in a desired rotation speed in relation to the motor rotation speed.

The use of two motors 568a, b brings about advantages. When two motors 568a, b are being used, the pressure exerted by the respective gears 566a, b on the gear rack 564 is reduced compared to when a single motor and singe gear is used, as the pressure is divided between the gears 566a, b. this means the gear rack 564 and the gears 566a, b become less worn and thus has an improved service life.

Further, the use of two motors brings about that counterweight arrangement 550 will still function relatively well even in case one motor 566a is not being operable. Hence, in case one of the motors is not usable for some reason, the other motor 566b will still be able to move the weight given that the rolling of the transloader is not extreme due to e.g. harsh weather. In fact, a single motor may typically be used for roll angles up to 2 degrees.

The motors 566a, b may advantageously be employed with lamellar breaks, not shown, or similar which may be used to lock 566a, b the motors so as to prevent motion of the weight 552 during times when the weight is not intended to be moved. The breaks used are typically rated to 1.5 times the maximum torque that the motor can produce meaning that the motors 566a, b do not have a sufficient torque to start rotating as the breaks are active.

In addition to the above breaks, the counterweight arrangement 550 may be employed with locking means, not shown, used to secure the weight 552 mechanically in the first end position 556. This do further improve the safety and seaworthiness of the transloader 200, 300, 400 as the weight is counteracted from moving during e.g. transport of the transloader 200, 300, 400 in harsh weather conditions.

The motors 568a, b are powered through cables located in a bendable cable cover 572. The cable cover 572 and the cables located therein are fastened to the bogie 559 such that the cable cover and the cables are bended in a smooth controlled manner as the weight 552 is traveling along the rail 562. The weight 552 is provided with a recess 574 on a side thereof such that the cable cover 572 may bend smoothly without contacting the weight 552.

The motors 466a, b may advantageously be powered using a variable frequency drive, VFD, not show, or a plurality of VFDs. The motors 466a, b may typically be 3-phase induction motors which are controlled by the VFD such that the rotation speed and the torque of the motors are controlled so as to move the weight 552 in a desired manner.

A PLC, a computer or similar may advantageously be used to control the motors 466a, b and consequently the movement of the weight 552.

The actual position of the weight 552 along the rail 562 may be determined using various types of sensors, not shown. For instance a sensor of the type absolute encoder may be used to determine the position of the weight 552 along the rail 562. This may be done by determining the rotation of any of the gears 566a, b acting on the gear rack 564. In the depicted counterweight arrangement 550 of FIG. 5, the gears 566a, b are rotated 29 turns as the weight 552 is traveling a total distance of 9.0 m. The use of an absolute encoder brings about that no recalibration of the position is needed in case of a power failure.

In the above example the motors 466a, b advantageously have a combined power of about 180 kW in order to be able to move the weight 552 as desired up to roll angles of 5 degrees. Roughly speaking, 125 kW are needed to move the weight 552 in an uphill inclination of 5 degrees, 45 kW are needed to accelerate the weight 552 as desired and 10 kW are needed in order to overcome friction when moving the weight 552.

The motors 466a, b are advantageously used to increase and to reduce the traveling speed of the weight 552. When increasing or maintaining a traveling speed of the weight 552, energy needs to be supplied to the motors. On the other hand, when the motors 466a, b are used to reduce the moving speed of the weight, the motors 466a, b will generate energy which is being recovered from the kinetic energy of the weight 552. The recovered energy may be feed back to the power system of the transloader 200, 300, 400 or may be feed to e.g. resistors where the recovered energy is used to produce heat. The resistors may be air cooled or water cooled.

Buffers 576 may be provided in vicinity to the first position 556 and the second position 558. The buffers 576 may be mounted such that they do not contact the weight 552 during normal operation of the movable weight 552. Hence, the buffers may be provided as a safety measure meaning that the weight 552 will hit the buffers 576 in case the weight 552 is accidentally moved too far along the rail 562. This means that the buffers 576 will mitigate the effects of an undesired collision between the weight 552 and the walls surrounding the weight 552 by absorbing kinetic energy from the weight 552 during a collision. In the depicted counterweight arrangement 550 the buffers are rated to 200 kN each.

In order to efficiently counteract the tilting momentum exerted by the crane 210, 310, 410 when the crane is operating on the portside, the movement of the weight 552 may be controlled as a function of the crane movement.

Due to the movement possibilities of the weight 552, the weight 552 may only be used to compensate for tilting momentums exerted by the crane 210, 310, 410 when operating on a port side thereof. This means that the weight 552 may advantageously be positioned in or in vicinity to the first end position 556 as the crane 210, 310, 410 is operating on a starboard side thereof. Hence the function controlling the movement of the weight 552 is preferably so configured that the weight 552 remains in vicinity of the first end position 556, i.e. in vicinity to the longitudinal centre line of the transloader 200, 300, 400, as the crane is operating on a starboard side thereof.

Figure 6:
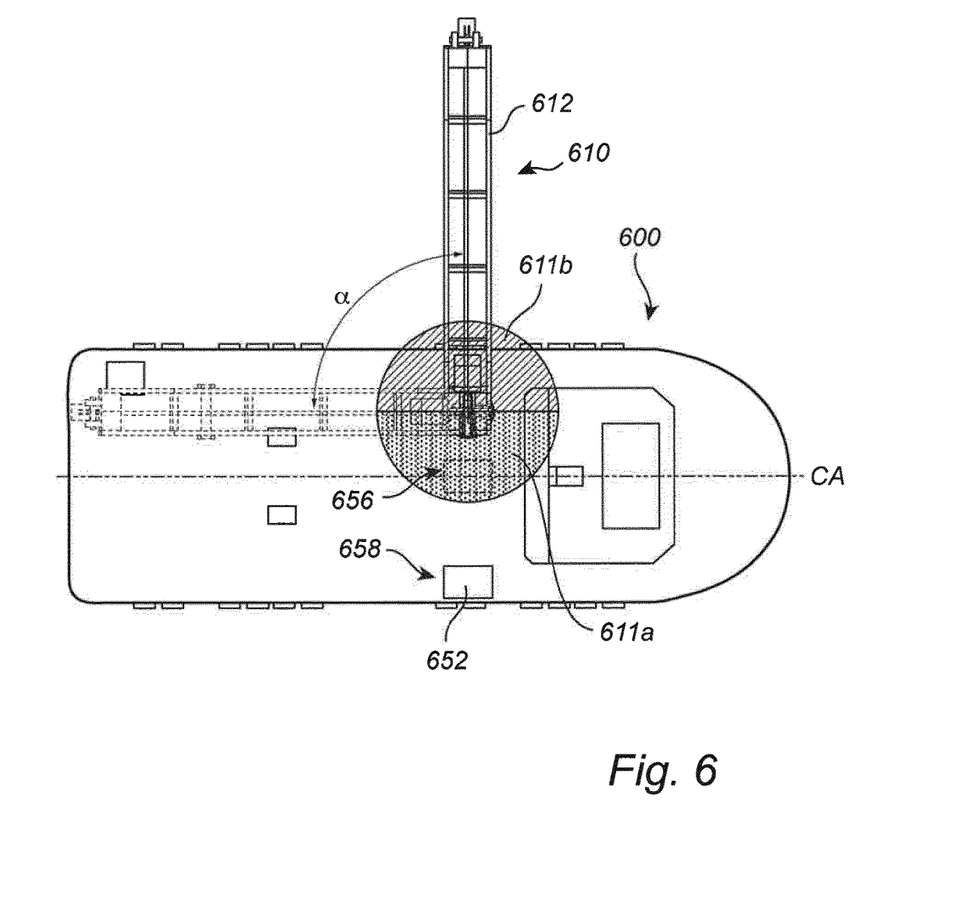
FIG. 6 is schematic top view of a transloader illustrating rotation angles of a crane and positions of a counterweight.

This is schematically illustrated in FIG. 6 which shows a simplified sketch of a transloader 600 from above. The transloader has a crane 610 which is offset in a port side direction of the transloader 600, corresponding to FIGS. 3 and 4. The crane 610 includes a crane arm 612. The crane arm 612 is shown in two different working positions of which one is indicated by dotted lines. Rotation angles α corresponding to when the crane 610 is operating on a starboard side thereof are indicated by the dotted area 611a in FIG. 6. When the crane 610 is operating through rotation angles α corresponding to the dotted area 611a the weight 652 is preferably positioned in the first end position 656 in vicinity of the longitudinal centre axis CA of the transloader 600. The weight 652 is shown in the first end position 656 using dotted lines.

On the other hand, when the crane 210, 310, 410, 610 is operating on a port side thereof, the weight 552, 652 may be used to compensate for a tilting momentum exerted by the crane 210, 310, 410, 610. Hence, the function controlling the movement of the weight 552, 652 is preferably so configured that the weight 552, 652 is moved from the first end position 556, 656 only while the bucket 318, 418 supported on the crane 210, 310, 410, 610 occupies a rotation angle α representing a location situated on a side pointed out by the port side direction of a vertical plane extending in parallel with the longitudinal centre axis CA of the transloader and coinciding with the axis of rotation of the bucket 318, 418, i.e. when the crane 210, 210, 410, 610 is operating on a port side thereof. In other words, the function is preferably configured such that the weight 552, 652 is moved from the first end position 556, 656 only while the cargo handling device 318, 418 occupies a rotation angle α representing a location situated on a side pointed out by the above discussed first side direction of a second vertical plane extending in parallel with the above discussed first vertical plane and coinciding with the axis of rotation.

This is schematically illustrated in FIG. 6 where rotation angles α corresponding to when the crane 610 is operating on a port side thereof are indicated by the dashed area 611b. When the crane 610 is operating through rotation angles α corresponding to the dashed area 611b, the weight 652 is moved between the first end position 656 and the second end position 658 as a function of the rotation angle α.

Preferably, the weight 552, 652 is moved as a function of the rotation angle α. The weight 552, 652 may thus be moved in response to the rotation angle α with or without taking the luffing angle β of the crane arm 212, 312, 412, 612 into account. Also the weight of an actual load being hoisted by the crane 210, 310, 410, 610 may be taken into account and compensated for when moving the weight 552, 652. According to a currently preferred embodiment, the weight 552, 652 is moved as a function of the of the rotation angle α of the bucket 318, 418 and consequently as a function of the rotation angle α of the crane arm 212, 312, 412, 612. A possible simple but yet effective movement scheme of the weight 552, 652 as a function of the rotation angle α will be described hereinafter with reference to graph 1 in FIG. 7 and FIG. 6.

Figure 7:
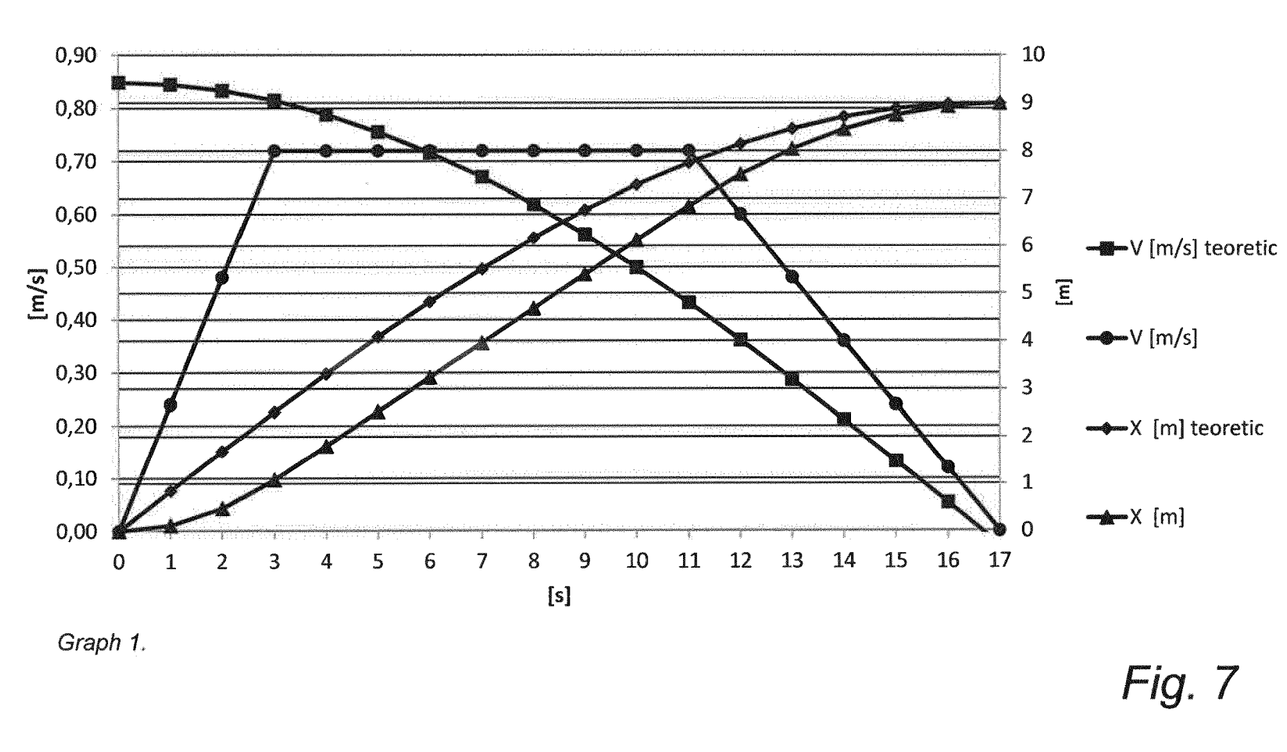
FIG. 7 is a graph illustrating plots of theoretical and actual positions and velocities of a counterweight used to compensate for a tilting momentum in a transloader.

Now referring to graph 1 in FIG. 7. Graph 1 illustrates theoretic and actual positions and velocities of the weight 552, 652 as a function of an elapsed time. The graph illustrates values for a crane capable of hoisting 50 tons and having a crane arm 212, 312, 412, 612 which is 36 m long, such as a McGregor K5036.

The elapsed time shown on the x-axis of the graph corresponds to a rotation of the crane arm 212, 312, 412, 612 and the bucket or cargo handling device 318 supported thereon form a position where the crane arm is parallel with the longitudinal centre axis CA of the transloader 200, 300, 400, 600, to a position where the crane arm 212, 312, 412, 612 is pointing straight out in a port side direction of the transloader 200, 300, 400, 600. In other words, the crane arm 212, 312, 412, 612 is rotated over a rotation angle α of 90 degrees during the elapsed time shown on the x-axis of graph 1. During the above rotation, the crane arm is rotated with a constant angular velocity throughout the illustrated rotation. The elapsed time of about 17 s is the actual time needed to rotate the crane arm 212, 312, 412, 612 over the 90 degree rotation angle α described above with the maximum allowed constant angular velocity when using a McGregor K5036 crane. When using a McGregor K5032 having a 32 m long crane arm 212, 312, 412, 612 the time needed to rotate the crane arm 212, 312, 412, 612 over the 90 degree rotation angle α described above is typically 14 s instead of 17 s, i.e. the maximum allowed constant angular velocity is higher for the McGregor K5032.

The above 90 degree rotation α is illustrated in FIG. 6. The crane arm 612 is consequently starting in a position where it is parallel with the longitudinal centre axis CA of the transloader 600. This position of the crane arm 612 is indicated by dotted lines. The crane arm 612 is then rotated 90 degrees over the rotation angle α of FIG. 6 to a position where the crane arm 612 is pointing straight out in a port side direction of the transloader 600. The position where the crane arm 612 is pointing straight out in a port side direction of the transloader 600 is shown by solid lines in FIG. 6.

According to the described movement scheme the weight is moved from the first end position 556, 656 in vicinity to the longitudinal centre axis CA to the second end position 558, 658 located on a starboard side of the transloader during the elapsed time of graph 1. The traveling distance of the 160 tons weight 552, 652 is in this particular example 9.0 m. Hence, the weight 552, 652 is moved a total distance of 9.0 m as the crane arm 212, 312, 412, 612 is rotating over a 90 degree angle α as described above.

The movement of the weight 652 during the 90 degree rotation is schematically illustrated in FIG. 6. When the crane arm 612 is in the position where the crane arm 612 is parallel with the longitudinal centre axis CA of the transloader 600, the weight is in the first end position 656 in vicinity to the longitudinal centre axis CA, as indicated by the weight 652 being drawn by dotted lines. As the crane arm 612 is moved through the illustrated rotation angle α of 90 degrees, the weight 652 is moved from the first end position 656 to the second end position 658. Hence, the weight 652 will be in the position 658 where the weight is drawn by solid lines, when the crane arm 612 is pointing straight out in a port side direction, as illustrated by the crane arm 612 being drawn by solid lines.

In order to even out or counteract a tilting momentum exerted by the crane arm 212, 312, 412, 612 in a transverse direction to the transloader 200, 300, 400, 600 during the above rotation of 90 degrees by means of moving the weight 552, 652, the weight should be moved in accordance with the plot having diamond shaped dots. As the weight 552, 652 is movable in a transverse direction to the longitudinal centre axis CA of the transloader, the weight may be used to even out or counteract tilting momentums exerted in a transverse direction to the transloader 200, 300, 400, 600. In other words, the weight 552, 652 may be moved so as to counteract rolling of the transloader 200, 300, 400, 600 about its longitudinal centre axis CA.

It is to be noted that the plot of the theoretical positions of the weight illustrated in the plot with the diamond shaped dots represents a quarter period sine wave. The skilled person will realize this as the sine function is derivable from a projection of an infinitesimal element positioned on a rotating disc.

However, in order to have the weight 552, 652 follow the theoretical or optimal positions illustrated by the plot having diamond shaped dots, the weight will need to be moved in a velocity as illustrated in the plot having square dots. This is however not practically realizable as the weight 552 is resident with no movement in the first end position 556 in vicinity to the longitudinal centre axis CA of the transloader 200, 300, 400, 600 as the crane 210, 310, 410, 610 begins to rotate to a port side thereof, i.e. stats the above 90 degree rotation α. Hence, the weight should reach a velocity of about 0.85 m/s in no time at all which is not physically possible.

In order to address the problem of a practically not possible movement and acceleration, the weight 552, 652 may according to the described movement scheme be moved according to a velocity scheme illustrated by the plot having circular shaped dots. As can be seen from the plot, the movement of the weight 552, 652 is divided into three different stages namely an acceleration stage, a constant speed stage and a deceleration stage.

In the acceleration stage, the velocity of the weight 552, 652 is increased linearly for the first 3 s of the rotation until the weight 552, 652 reaches a constant moving or traveling speed of 0.72 m/s.

In the constant speed stage the moving speed is kept constant at 0.72 m/s for 8 s, i.e. until 11 s has elapsed.

Finally in the deceleration stage, the moving speed of the weight is reduced linearly for 6 s until the weight 552, 652 stops, i.e. until 17 s has elapsed. Hence, the weight 552, 652 stops in the second end position 558, 658 9.0 m from where it started travel 17 s earlier.

By utilizing the above three stage scheme for the movement of the weight 552, the position of the weight with respect to the time elapsed is illustrated in the plot having triangular dots.

As can be seen from the plots, the use of the above three stage scheme for the movement will cause the weight 552, 652 to move in a manner reasonably well corresponding to the theoretical or optimal movement. This means that the above movement scheme may be used to effectively compensate for tilting momentums exerted by the crane 210, 310, 410, 610 as the crane rotates with a constant angular speed through the above 90 degree rotation angle α.

When the crane arm 212, 312, 412, 612 is rotated in an opposite direction, i.e. is returned back to a position being parallel with the longitudinal centre axis CA of the transloader 200, 300, 400, 600, the weight 552, 652 will be moved according to the same three stage movement scheme but in an opposite direction. In other words, the weight 552, 652 will be accelerated linearly for 6 s to reach a velocity of 0.72 m/s. The velocity will be kept constant for 8 s before the weight 552, 652 is decelerated linearly to a stop under a period of 3 s.

The above movement scheme will be applicable irrespective of a clockwise rotation or a counterclockwise rotation.

It is to be noted that the weight 552, 652 may be moved as a function of any rotation angle α. Hence the weight may be moved according to the above scheme for any rotation angle α and not just for a 90 degree rotation angle α.

However, when the crane arm 212, 312, 412, 612 is rotated in a more complex way i.e. not using a constant angular velocity through a 90 degree rotation angle α, a more sophisticated movement scheme may preferably be used. Below a more sophisticated movement scheme based on a PID control loop will be described with reference to FIG. 6. The below described movement scheme is suitable for any rotation angle α meaning that the movement scheme is suitable for any crane movement as it is not optimized for any particular angular velocity or any particular rotation angle α.

Initially the rotation angle α of the crane arm 612 is determined. The rotation angle α is preferably determined using the above described sensors. In the following description relating to the movement scheme of the weight 552, 652 the rotation angle α is set to a 0 value when the crane arm 612 is pointing in a stern direction of the transloader 600 as illustrated by dotted lines in FIG. 6. The value of the rotation angle α is increased as the crane arm 612 is rotated clockwise. This means that the rotation angle α has a value of 90 degrees when the crane arm 610 is pointing straight out in a port side direction as shown by solid lines in FIG. 6.

When the rotation angle α is determined to be in the range 180≤α≤360 degrees the weight 552, 652 will be kept in the first end position 556, 656. In other words, the weight will be kept static in the first end position 556 in vicinity to the centre axis CA of the transloader 600 as the crane is operating on a starboard side thereof, i.e. through the angles indicated by the dotted area 611a in FIG. 6.

On the other hand, when the rotation angle α is determined to be in the range 0<α<180 degrees the movement of the weight 552, 652 will be controlled using a control loop, i.e. when the crane 610 is operating on a port side thereof as indicated by the dashed area 611b in FIG. 6.

When the crane 610 is determined to operate with a rotation angle α in the range 0<α<180 degrees the desired movement direction of the weight 552, 652 is determined by determining the rotation direction of the crane arm 612 for two angle intervals. If the crane 610 is operating with a rotation angle in the interval 0<α<90 degrees the weight 552, 652 will be moved towards the second end point 558, 658 as the rotation angle α increases. On the other hand, when the crane 610 is operating with a rotation angle in the interval 90≤α<180 degrees the weight 552, 652 will be moved towards the second end point 558, 658 as the rotation angle α decreases. This means that the weight 552, 652 will be moved towards the second end position 558, 658 as the lever arm component of the crane arm 612 in the port side direction of the transloader 600 increases.

The desired traveling velocity $V_{sp}$ of the weight 552, 652 for a specific rotation angle α and a specific angular velocity may be determined using the following equation: $V_{sp}(\alpha) = r \cdot d\alpha/dt \cdot \cos(\alpha)$, where α is the rotation angle and r is the total travel length of the weight 552, 652. Hence, in the depicted transloader 600, r corresponds to a travel length of 9.0 m. The rotation angle α and the angular velocity may preferably be determined using the above described sensors.

The desired position $X_{sp}(\alpha)$ of the weight 552, 652 with respect to a specific rotation angle α may be calculated using the following equation: $X_{sp}(\alpha) = r \cdot \sin(\alpha)$, where α is the rotation angle and r is the total travel length of the weight 552, 652.

The actual position $X_a(r,\alpha)$ of the weight 552, 652, for a specific moment of time and in practice for a specific rotation angle α of the crane 610, may for instance be determined using the above described absolute encoder.

Hence, when it is determined that the crane 610 is operating through a rotation angle α where the weight 552, 652 is to be moved, i.e. when the rotation angle α is determined to be in the range 0<α<180 degrees, an acceleration to a desired traveling velocity $V_{sp}(\alpha)$ is initiated. This is performed by a PID control loop, which will be described below.

In a first step the of the control loop the position deviation $e(\alpha)$ of the weight with respect to the desired position $X_{sp}(\alpha)$ for a specific rotation angle α is determined by comparing the desired position $X_{sp}(\alpha)$ with the actual position $X_a(r,\alpha)$. This may consequently be written as the following equation: $e(\alpha) = X_{sp}(\alpha) - X_a(r,\alpha)$.

The determined position deviation $e(\alpha)$ of the weight 552, 652 is then used to adjust the actual traveling velocity $V_a(\alpha)$ of the weight 552, 652 towards the desired traveling velocity $V_{sp}(\alpha)$. This is performed by feeding the position deviation $e(\alpha)$ and the desired traveling velocity $V_{sp}(\alpha)$ into the control loop. Hence, an adjusted traveling velocity $V_{adj}(\alpha)$ taking into account the position deviation $e(\alpha)$ and the desired traveling velocity $V_{sp}(\alpha)$ may be calculated, using the following equation: $V_{adj}(\alpha) = k \cdot e(\alpha) + V_{sp}(\alpha)$, where k is an amplification factor. This means that the traveling velocity of the weight 552, 652 is forced towards the desired traveling velocity $V_{sp}(\alpha)$ more rapidly if a large amplification factor is k is used. On the other hand, a large amplification factor may result in an unstable system suffering from overshoots why the application factor k has to be chosen carefully.

It is to be noted that control loop may control the traveling velocity of the weight 552, 652 to exceed the desired traveling velocity $V_{sp}$. This is advantageous as the weight 552, 652 need to be accelerated to a velocity being higher than the desired traveling velocity $V_{sp}$ in order to reach the desired position $X_{sp}(\alpha)$ when traveling from the first end position 556, 656 in vicinity to the centre axis CA of the transloader.

Further, it is to be noted that the weight 552, 652 will stop in the desired position $X_{sp}(\alpha)$ if the crane stops rotating and stops in a specific rotation angle $\alpha$.

By utilizing the above control loop, the weight 552, 652 will consequently travel from the first end position 556, 656 to the second end position 558, 658 as the rotation angle $\alpha$ is changed from 0 degrees to 90 degrees or as the rotation angle $\alpha$ is changed from 180 degrees to 90 degrees.

The above described control loop will handle situations where the crane arm 610 is rotated such that the lever arm component of the crane 610 in the port side direction of the transloader 600 increases. On the other hand, when the crane 610 is rotated such that the lever arm component of the crane 610 in the port side direction of the transloader 600 decreases, special rules taking care of the deceleration of the weight 552, 652 when traveling towards the first end position 556, 656 need to be designed, as the above control loop does not take into account that the weight 552, 652 need to be decelerated and stopped when reaching the first end position 556, 656 in vicinity to the centre axis CA of the transloader 600. In practice angle intervals may preferably be designed for which the weight 552, 652 is decelerated if the crane is rotated such that the lever arm component of the crane 610 in the port side direction of the transloader 600 decreases, i.e. when the crane 610 is operating with a rotation angle $\alpha$ in the interval $0<\alpha<90$ degrees and the rotation angle $\alpha$ decreases or when the crane 610 is operating with a rotation angle $\alpha$ in the interval $90\leq\alpha<180$ degrees and the rotation angle $\alpha$ increases.

In the depicted transloader 200, 300, 400, 600 having the above described 160 tons weight 452, 552, 652 and the above described electrical motors 568a, b the control loop may preferably be designed so as to decelerate the traveling velocity of the weight 452, 552, 652 as the crane 210, 310, 410, 610 operates in the following rotation angle intervals $0\leq\alpha\leq26$ degrees and $154\leq\alpha\leq180$ degrees as the lever arm component of the crane 610 in the port side direction of the transloader 200, 300, 400, 600 decreases. The rotation angle intervals $0\leq\alpha\leq26$ degrees and $154\leq\alpha\leq180$ degrees are chosen such that the weight 452, 552, 652 may be decelerated and stopped in the first end position 556, 656 in a controlled and smooth manner when using the described 160 tons weight 452, 552, 652 and the described electrical motors 568a, b. Hence, other rotation angle intervals may preferably be chosen for other systems having other characteristics.

Further, the skilled person realizes that numerous of other movement schemes may be used without departing from the scope of the present invention. For instance, the weight 552, 652 may be moved linearly with regard to the rotation angle $\alpha$.

In addition to only base the movement of the weight 552, 652 on the rotation angle $\alpha$ as described above it is also possible to take the luffing angle $\beta$ of the crane arm 212, 312, 412, 612 or jib into consideration. By taking the luffing angle $\beta$ into consideration an actual and not a maximal lever arm may be compensated for. This brings about that the movement scheme of the weight 552, 652 will become slightly different. Further, the compensation may thus be more accurate resulting in a further reduced roll of the transloader 200, 300, 400, 600. The actual lever arm component in direction being transverse to the centre axis CA of the transloader 200, 300, 400, 600 may be calculated using basic trigonometric calculations.

As discussed above, the rotation angle $\alpha$ and luffing angle $\beta$ may be determined using sensors or similar or may be determined using no feedback, such as based on operating times. Also the position of the weight 552, 652 may be determined using sensors or similar or may be determined using no feedback, such as based on operating times.

Also the actual load hoisted by the crane 210, 310, 410, 610 by means of the cargo handling device or bucket 318, 418 may be taken into consideration. By taking the actual load hoisted into consideration, the tilting momentum exerted by the hoisted load may be compensated for. Hence, the weight 452, 552, 652 may be moved so as to counteract the tilting momentum exerted by the load in a direction being transverse to the centre axis CA of the transloader 200, 300, 400, 600. This result in that the roll of the transloader 200, 300, 400, 600 may be further reduced. The hoisted load will exert a tilting momentum determined by the weight of the load and the lever arm used.

The weight 452, 552, 652 may as discussed above be used to compensate for tilting momentums in a port side direction being transverse to the centre axis CA of the transloader 200, 300, 400, 600. Hence, the actual lever arm component in a port side direction being transverse to the centre axis CA of the transloader 200, 300, 400, 600 may preferably be taken into account. As discussed above, the actual lever arm component may be calculated using basic trigonometric calculations.

The weight of the actual load being hoisted may for instance be determined by measuring the power required to hoist the load or by means of a strain sensor. The skilled person will understand that the weight of the load being hoisted may be determined using various methods and sensors.

When having determined the actual lever arm component in a port side direction being transverse to the centre axis CA of the transloader 200, 300, 400, 600 and the weight of the actual load being hoisted, the weight 552, 652 may be moved so as to compensate for the tilting momentum exerted by the actual load being hoisted such that the roll of the transloader 200, 300, 400, 600 is reduced.

The above description has been based on a situation where the crane 210, 310, 410, 610 is offset on a port side of the transloader 200, 300, 400, 600 and the weight is movable on a starboard side. It is of course possible to offset the crane 210, 310, 410, 610 on a starboard side of the transloader 200, 300, 400, 600 and to arrange the weight 552, 652 movably on a port side, without departing from the scope of the invention. The skilled person realizes that the weight 552, 652 may be moved in a corresponding manner in respect to the rotation angle $\alpha$ in case the crane 210, 310, 410, 610 is offset on a starboard side of the transloader 200, 300, 400, 600 and the weight 552, 652 is arranged movably on a port side of the transloader 200, 300, 400, 600.

In the above description the weight 552 has been described as being made of steel. However, other weight 552 may for natural reasons be made of other materials than steel. For instance, the weight 552 may be made of concrete or lead. The concrete or lead may be moulded to the shape and size of the weight 552 or the weight may be assembled by a plurality of elements. Virtually any material may be used as long as a sufficiently heavy weight can be realized that may fit into the compartment used for the counterweight arrangement 550. A plurality of materials may also be used to form the weight 552.

Also the shape of the weight 552 may be altered. This may be done to e.g. to shift the mass center 554 of the weight 552 or to make the weight 552 fit into a compartment having specific constraints. For instance, in some cases the weight may have to be lower in order to fit below deck in the vessel where it is being installed. Further, a plurality of weights 552, 652 may be used, i.e. the total desired counterweight may be divided into a plurality of physically separated weights 552, 652.

Above it has been described how the weight 552 is moved by means of electrical motors 568*a, b*. It is however possible to use pneumatic or hydraulic motors to move the weight 552. The weight may also be movable by means of friction wheels carrying the weight and acting directly on a rail carrying the weight. Additionally, a buttress thread, a pneumatic cylinder, a hydraulic cylinder or similar may be used to move the weight 552. Additionally, the gear rack 564 of FIG. 5 may be positioned in different positions, such as outside the rail 562 or between the tracks of the rail 562. The gear rack 564 may be located in a central position or in a non central position with respect to the rail 564. Further, a plurality of gear racks 564, buttress threads, pneumatic cylinders, hydraulic cylinders or similar may be used move the weight 552. Also the number of motors 568*a, b* used may be altered.

The weight 552 may also be mechanically coupled to the rotation of the crane arm 212, 312 such that the weight is moved as the crane arm 212, 312, 412 is rotating about the rotation angle. The coupling may e.g. be realized using wires, gears, axes or a combination thereof.

The weight 552 may be supported by rollers provided on a floor of the compartment where the weight 552 is resident. When using such an arrangement, the walls of the compartment may also be provided with rollers for controlling the moving direction of the weight 552 and for avoiding direct contact with the walls. Also slide bearings or an air cushion may be used to support the weight to give a few more examples.

Further, the wheels 560 of the bogie 559 may be arranged on a side of the bogie 559 such that the wheels are arranged to rotate outside the weight 552 rather than under the weight 552. By this arrangement the combined height of the bogie 559 and the weight 552 may be reduced.

Furthermore, energy storing buffers, like air filled cylinders may be arranged, such that energy from the moving weight 552 is stored in the buffers. The stored energy may thus be used to accelerate the weight 552 when the weight 552 is about to move in an opposite direction.

Above it has been described how the weight 552 is moved on a planar rail 562. It is however possible to arrange the weight 552 on a non-planar rail. For instance, a U shaped rail may be utilized as this may result in a counterweight arrangement 450, 550 which needs less energy in order to function. More specifically, the rail 562 may be shaped such that the weight 552 may be accelerated in a downhill slope and subsequently be decelerated in an uphill slope. This means in practice that portions of the rail 562 corresponding to the first end position 556 and the second end position 558 may be located higher than the portion of the rail 556 positioned in between the respective end positions 556, 558. Hence, when the weight 552 is moved from the first end position 556 or the second end position 558, the weight may be accelerated in a downhill slope. Following this the weight 552 will travel along a U shaped portion of the rail and will thereafter preferably be decelerated in an uphill slope before reaching the other end position 556, 558.

Even though the invention has been described with reference to specific exemplifying embodiments thereof, many different alterations, modifications and the like will become apparent for those skilled in the art. Variations to the disclosed embodiments may be understood and effected by the skilled person in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. Vessel comprising:
a cargo transloading system,
said cargo transloading system comprising:
a crane supporting a cargo handling device, and
a counterweight arrangement,
said cargo handling device being rotatable about a vertical axis of rotation arranged with a first fixed offset in a first side direction with regard to a first vertical plane coinciding with a longitudinal centre axis of said vessel,
said counterweight arrangement comprising a weight which is movable such that the mass centre of said weight is laterally displaceable between a first end position in which said mass centre is arranged in the vicinity of said first vertical plane and a second end position in which said mass centre is arranged with a second offset in a second side direction opposite to said first side direction with regard to said first vertical plane,
said counterweight arrangement being arranged to move said weight while said cargo handling device is rotated about said axis of rotation as a function of the rotation angle (α) wherein said weight is movable by means of an electric motor; wherein said electric motor is arranged to act directly or indirectly on a gear rack such that said weight is moved.

2. Vessel according to claim 1, wherein said function is configured such that said weight is movable from said first end position only while said cargo handling device occupies a rotation angle (α) representing a location situated on a side pointed out by said first side direction of a second vertical plane extending in parallel with said first vertical plane and coinciding with said axis of rotation.

3. Vessel according to claim 1 wherein said function is configured such that said weight is movable from said first end position with regard to a lever arm component of said cargo handling device in said first side direction with regard to said vertical axis of rotation, such that at least a portion of a tilting momentum exerted by said cargo handling device on said crane is compensated for.

4. Vessel according to claim 1, wherein said weight is arranged to be moved along a direction being normal to said first vertical plane.

5. Vessel according to claim 1, wherein said weight is movably arranged on a rail by means of wheels.

6. Vessel according to claim 1, wherein said electric motor is arranged to increase and to reduce a moving speed of said weight.

7. Vessel according to claim 6, wherein said electric motor is arranged to recover kinetic energy from said weight, when reducing said moving speed of said weight.

8. Method for controlling a cargo transloading system for a vessel, said cargo transloading system comprising a crane supporting a cargo handling device, and a counterweight arrangement, said cargo handling device being rotatable about a vertical axis of rotation arranged with a first fixed offset in a first side direction with regard to a first vertical plane coinciding with a longitudinal centre axis (CA) of said vessel, said counterweight arrangement comprising a weight which is movable such that the mass centre of said weight is laterally displaceable between a first end position in which said mass centre is arranged in the vicinity of said first vertical plane and a second end position in which said mass centre is arranged with a second offset in a second side direction opposite to said first side direction with regard to said first vertical plane, said method comprising:

moving said weight while said cargo handling device is rotated about said axis of rotation as a function of the rotation angle ($\alpha$),         by moving said weight from said first end position only while said cargo handling device occupies a rotation angle ($\alpha$) representing a location situated on a side pointed out by said first side direction of a second vertical plane extending in parallel with said first vertical plane and coinciding with said axis of rotation wherein said weight is movable by means of an electric motor; wherein said electric motor is arranged to act directly or indirectly on a gear rack such that said weight is moved.

9. Method according to claim 8, further comprising moving said weight from said first end position with regard to a lever arm component of said cargo handling device in said first side direction with regard to said vertical axis of rotation, such that at least a portion of a tilting momentum exerted by said cargo handling device on said crane is compensated for.

10. Use of a vessel according to claim 1 for transloading cargo between a first type of transportation and second type of transportation by positioning said vessel between said first type of transportation and said second type of transportation and transloading cargo between said first type of transportation and said second type of transportation by means of said transloading system of said vessel.

11. Use according to claim 10, wherein said first type of transportation is an ocean going ship and said second type of transportation is a feeder barge.

12. Use according to claim 11, wherein said vessel is positioned between said ocean going ship and said feeder barge such that said axis of rotation is located closer to said ocean going ship than to said feeder barge.

\* \* \* \* \*